UNITED STATES PATENT OFFICE.

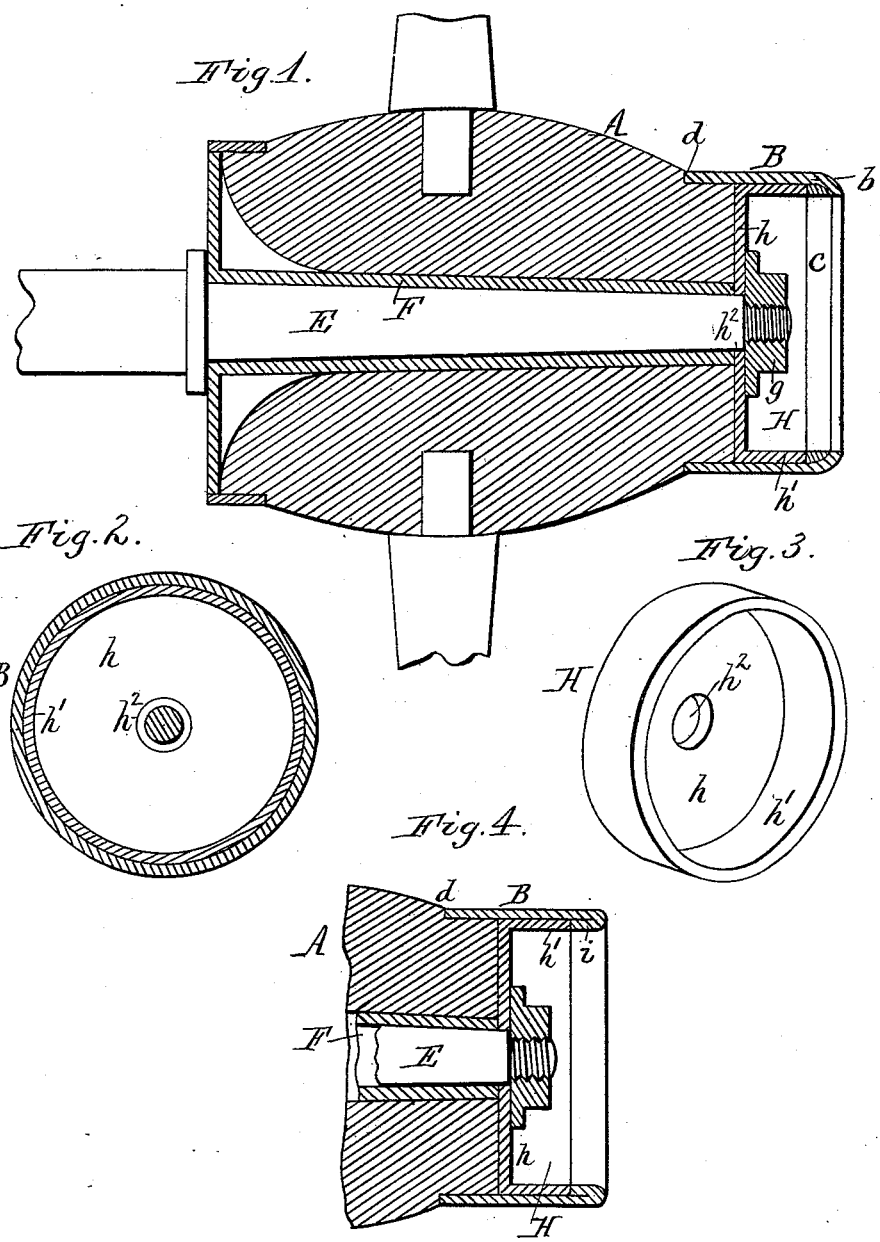

CHARLES L. WIEDRICH, OF BUFFALO, NEW YORK, ASSIGNOR TO PRATT & LETCHWORTH, OF SAME PLACE.

VEHICLE-WHEEL.

SPECIFICATION forming part of Letters Patent No. 499,813, dated June 20, 1893.

Application filed February 28, 1893. Serial No. 464,071. (No model.)

*To all whom it may concern:*

Be it known that I, CHARLES L. WIEDRICH, a citizen of the United States, residing at Buffalo, in the county of Erie and State of New York, have invented new and useful Improvements in Vehicle-Wheels, of which the following is a specification.

This invention relates to vehicle wheels having a wooden hub provided at its outer end with a metallic band. This hub band usually abuts with its inner end against an annular shoulder or offset formed near the outer end of the wooden hub. The outer portion of the hub is generally made of slightly larger diameter than the hub band, so that in driving the band against the shoulder of the hub, it is wedged upon the hub. The central opening in the wooden hub which receives the axle box is also made somewhat smaller in diameter than the external diameter of the box, so that the box is wedged into the hub in driving it home. The axle box is commonly provided at its inner portion with external ribs or rings which embed themselves in the hub in driving the box into it and which serve to hold the box against turning in the hub. In applying the axle box and the hub band to the hub, the band is slipped over the end of the hub, and the axle box is inserted in the bore of the hub, and these parts are then driven home by placing the hub, with the band upward, under the plunger or follower of a suitable press. The axle box is driven a greater distance into the bore of the hub than the band is forced inward on the end of the hub, so that the band is seated against the shoulder of the hub before the axle box is fully driven home, and in driving the latter into place, the additional impulse of the plunger necessary to do so, is liable to cause the inner end of hub band to enter said shoulder and crack or split the wood, rendering the hub unsightly in appearance.

The object of my invention is to provide simple means for limiting the inward movement of the band on the hub, after the same is properly seated against the shoulder of the hub, so as to obviate the above objection.

In the accompanying drawings:—Figure 1 is a sectional elevation of a wheel hub provided with my improvement. Fig. 2 is a cross section thereof, in line 2—2, Fig. 1. Fig. 3 is a perspective view of the hub-band stop. Fig. 4 is a fragmentary sectional elevation, showing my improvement in connection with a hub band of slightly different construction.

Like letters of reference refer to like parts in the several figures.

In the construction shown in Figs. 1 and 2, my improvement is shown in connection with a hub band having its outer end reinforced by an internal ring which bears against the inner side of an inwardly-turned flange, formed at the outer end of the hub-band, but the improvement is also applicable to hub bands of different construction.

A is the hub, B the hub band, $b$ the flange at the outer end of the band, and $c$ the reinforcing ring fitted against the flange.

$d$ is the annular shoulder which is formed near the outer end of the hub and against which the inner end of the hub band abuts.

E is the axle-spindle, F the metallic axle box seated in the hub, and $g$ the nut applied to the threaded shank of the spindle, whereby the hub is retained upon the spindle.

H is a stop which limits the inward movement of the hub band on the hub, when the same is driven with its inner end against the shoulder $d$ of the hub. In the construction shown in the drawings, this stop consists of a circular plate or disk $h$ resting with its rear side against the flat outer end of the hub and provided with an outwardly-extending marginal flange or rim $h'$ which is adapted to bear with its outer end against the rear side of the reinforcing ring $c$ of the hub band. The flange $h'$ is made of such a depth, that in driving the band upon the hub, the inner edge of the reinforcing ring $c$ abuts against the outer edge of said flange, as soon as the inner end of the hub band is seated against the shoulder of the hub and thereby arrests the farther inward movement of the band on the hub. The disk $h$ is provided with a central opening $h^2$ for the passage of the axle spindle, and the retaining nut $g$ bears against the front side of the disk. The edge of the opening in the disk is preferably fitted snugly around the axle-spindle, as shown, so as to exclude oil and dirt from the end of the hub. By interposing this stop-disk between the hub and the internal shoulder of the hub band, the inward movement of the band upon the hub is effectually limited when the band is properly seated against the shoulder of the hub, thereby preventing the band from cracking or splitting the wood adjacent to the shoulder and preserving a finished appearance of the hub. As the stop-disk is a separate part, it may be nickel-plated, or constructed of brass or other material contrasting with the hub or band, to produce a sightly and pleasing effect. It can be readily stamped in one piece from sheet metal and is therefore inexpensive.

In the modified construction shown in Fig. 4, the hub band has no internal stiffening ring, but its outer portion is simply doubled inwardly upon itself, and the internal shoulder $i$ thus formed, abuts against the outer end of the stop-flange $h'$.

I claim as my invention—

1. The combination with a hub, of a band applied to the outer end thereof and having an internal flange or shoulder, and a stop-plate seated against the end of the hub and having a projecting rim against which the internal shoulder of the hub band abuts, substantially as set forth.

2. The combination with a hub, of a band applied to the outer end of the hub and having an internal flange or shoulder, and a stop-plate bearing against the end of the hub and having an opening for the passage of the axle spindle and an outwardly-extending marginal rim against the outer end of which the shoulder of the hub band abuts, substantially as set forth.

Witness my hand this 23d day of February, 1893.

CHAS. L. WIEDRICH.

Witnesses:
JNO. J. BONNER,
FRED. C. GEYER.